US008735856B2

(12) United States Patent
Lolla et al.

(10) Patent No.: US 8,735,856 B2
(45) Date of Patent: May 27, 2014

(54) FIBER OPTIC LIQUID LEVEL DETECTOR

(75) Inventors: Kameswara Rao Lolla, Bangalore (IN); Subramanian Duraiswamy, Bangalore (IN)

(73) Assignee: Department of Space, Indian Space Research Organization, Bangalore (IN)

( * ) Notice: Subject to any disclaimer, the term of this patent is extended or adjusted under 35 U.S.C. 154(b) by 249 days.

(21) Appl. No.: 13/375,834

(22) PCT Filed: Nov. 23, 2009

(86) PCT No.: PCT/IN2009/000677
§ 371 (c)(1),
(2), (4) Date: Dec. 2, 2011

(87) PCT Pub. No.: WO2010/140161
PCT Pub. Date: Dec. 9, 2010

(65) Prior Publication Data
US 2012/0085945 A1 Apr. 12, 2012

(30) Foreign Application Priority Data
Jun. 4, 2009 (IN) .......................... 1318/CHE/2009

(51) Int. Cl.
*G02B 5/04* (2006.01)
(52) U.S. Cl.
USPC ...... 250/577; 250/576; 250/227.11; 250/903; 73/290 R

(58) Field of Classification Search
USPC ............ 250/573, 576, 577, 901, 903; 385/12, 385/39; 73/290 R; 347/85
See application file for complete search history.

(56) References Cited

U.S. PATENT DOCUMENTS

| 5,381,022 A * | 1/1995 | Nemeth et al. ................ 250/577 |
| 5,616,929 A | 4/1997 | Hara |
| 6,801,687 B2 * | 10/2004 | Pierce ............................. 385/28 |
| 2009/0109525 A1 | 4/2009 | Ogle et al. |

FOREIGN PATENT DOCUMENTS

| EP | 0753411 | 1/1997 |
| EP | 2063236 | 5/2009 |

* cited by examiner

*Primary Examiner* — Kevin Pyo
(74) *Attorney, Agent, or Firm* — Antonelli, Terry, Stout & Kraus, LLP.

(57) ABSTRACT

The present invention provides a hollow prism for detecting liquid level in the presence of an optical beam, including a hollow member, dielectric members sealed to the hollow member with one of the dielectric members arranged at an inclined angle to the other, a sealed hollow space disposed between said dielectric members, wherein an incident optical beam enters through the first dielectric member at normal incidence and exits as an emergent beam through the second dielectric member, and wherein the emergent optical beam remains undeviated when the hollow member not immersed in a liquid medium and the emergent beam suffers deviation when immersed in the liquid medium. The present invention also provides a fiber optic liquid level detector with the hollow prism for detecting liquid levels.

24 Claims, 14 Drawing Sheets

FIBER OPTIC LIQUID LEVEL DETECTOR

TECHNICAL FIELD

The present invention relates to a hollow prism, for detecting liquid level. The present invention also relates to a fiber optic liquid level detector with the hollow prism of the present invention.

BACKGROUND OF THE INVENTION

Level of a liquid in a tank can be detected by many methods, viz., a float coupled to an external read-out either mechanically or magnetically, or devices that manipulate Ultrasound/Optical waves or capacitance based sensors. Each method of detection has its merits and demerits.

Cryogenic fluids such as liquid Nitrogen, liquid Oxygen, liquid Hydrogen and liquid Helium find extensive application in Industry, Aviation, Space Technology and Scientific Research. In most of these application areas, the study of the cryogenic liquids for their dynamic behavior, during filling or emptying of large cryogenic tanks, as well as, the reliable monitoring of these fluids quantitatively when such operations are effected at high flow rates has grown into an active area of research. In particular, the measurement of cryogenic fuel and the oxidizer levels in large tanks of the cryogenic systems is crucial task of paramount importance, particularly when the application area involves sensing and regulation of complex instrumentation tasks, in a coordinated manner.

A number of liquid-vapor (L-V) interface sensing methods were used to facilitate such level measurement. The known methods relied upon differences in the resistance, the capacitance, the acoustic impedance or viscous damping in order to sense the location of the L-V interface. Among these methods, only the capacitance based sensing systems received considerable attention for wide-spread application in aerospace industry. However, the factors related to high cost, slow response, heavy weight and potential 'electric spark hazard' pose several questions on their reliability, especially when used for the detection of the liquid levels in fuel tanks in aerospace industry.

To address the problems specific to level-detection in fuel tanks related to aerospace industry, a variety of fiber-optic systems have evolved. Such systems have many advantages over conventional level sensing approaches: for example, they are electrically passive in nature, ensure inherently spark-free level-sensing and involve no moving mechanical parts. In explosive environment characteristic to liquid Hydrogen and liquid Oxygen, such features help to realize a safe operation with increased efficiency and reduced maintenance load. Further, optical fibers are four times lighter per unit volume and six times stronger than copper wires. They neither produce nor are prone to EMI, thereby lifting the need for shielding/insulation, which makes them substantially lighter than their electric counterparts. Such weight reduction is crucial in aerospace applications. Owing to the increasing demand for these fiber optic systems in telecom industry, they are also becoming competitive in cost. Further, as these devices sense the liquid level through principles of reflection/refraction, they facilitate extremely high speed level-detection.

Well known fiber-optic systems rely upon devices like small total internally reflecting prisms or spherical lenses mounted at the ends of two optical fibers, or a conically shaped optical fiber tip or a U-shaped bent optical fiber, for level detection. Depending upon the application, the said devices may suffer from a few limitations. For instance, in such devices, intensity of the reflected light is the basis for level-sensing which is dependent upon the refractive indices of both the liquid as well as the material used for the prism. Since the latter changes with the ambient conditions, the said devices when specifically used for measuring the level of cryogenic liquids need individual calibration at each of the operating pressure and temperature. These devices are also frequently designed to operate at an angle of 180° deviation, which, in some sense, leads to relatively increased 'volume' of sensing device.

The fabrication of such sensing devices involves optically finishing at least three or more surfaces to a high degree of surface accuracy and maintaining a precise angle of the prism. Further, the position of the sensing device relative to the light guiding devices is invariably fixed and not allowed any freedom for linear or angular motion.

U.S. Pat. No. 6,801,678 discloses a fiber optic level detector using Fresnel reflection based liquid sensor in which part of the transmitted light reflects back at interface boundaries where the refractive indices are different and the reflected light intensity depends upon the refractive index of the fiber and liquid under ambient conditions.

The refractive characteristics of solid prisms do not permit transmission of optical beams without deviation. The emerging optical beam always deviates from the incident optical beam, whether the prism is in air or immersed in liquid. Further, when immersed in liquids, the amount of deviation in such prisms depends upon the refractive index of the liquid medium as well as that of the material used for fabrication of the prism. Both these factors necessitate recalibration and repositioning procedures in solid prism based fiber optic level detectors whenever the liquid under level measurement is changed or its operating conditions change dynamically.

Objects of the Invention

The primary object of the present invention is to provide a hollow prism for detecting liquid level.

An object of the present invention is to provide a hollow prism for detecting liquid level that exhibits a characteristic ambient-dependent refractive behavior in the presence of an optical beam from a source.

Another object of the present invention is to provide a hollow prism for detecting liquid level with a leak-tight prismatic hollow space filled with air or vacuum.

Yet another object of the present invention is to provide a hollow prism for detecting liquid level, where the level detection process is independent of the refractive index of the optical material used for the fabrication of the hollow prism.

Still another object of the present invention is to provide a hollow prism for detecting liquid level, where the volume of the optical material present in level-sensing region of the hollow prism is reduced.

Yet another object of the present invention is to provide a hollow prism for detecting liquid level, where changes in ambient conditions like pressure and temperature of liquid do not influence the refractive behavior of the hollow prism.

Still another object of the present invention is to provide a hollow prism for detecting liquid level, where the emergent optical beam is undeviated from the direction of incident optical beam, when the hollow prism is not immersed in a liquid medium.

Still another object of the present invention is to provide a hollow prism for detecting liquid level, where the emergent optical beam is deviated from the direction of incident optical beam, when the hollow prism is immersed in a liquid medium.

Still another object of the present invention is to provide a hollow prism for detecting liquid level having three degrees of freedom for linear motion along the three reference axes and one degree of freedom for rotational motion about the z-axis.

It is also an object of the present invention to provide a hollow prism for detecting liquid level that can act as a float in liquid medium.

Further object of the present invention is to provide a fiber optic liquid level detector with the hollow prism of the present invention for detecting liquid levels.

BRIEF DESCRIPTION OF THE DRAWINGS

FIG. 3($c$) depicts the possible degrees of freedom for linear motion of the hollow prism along x, y and z axes and rotary motion about z axis.

SUMMARY OF THE PRESENT INVENTION

Figure 1:
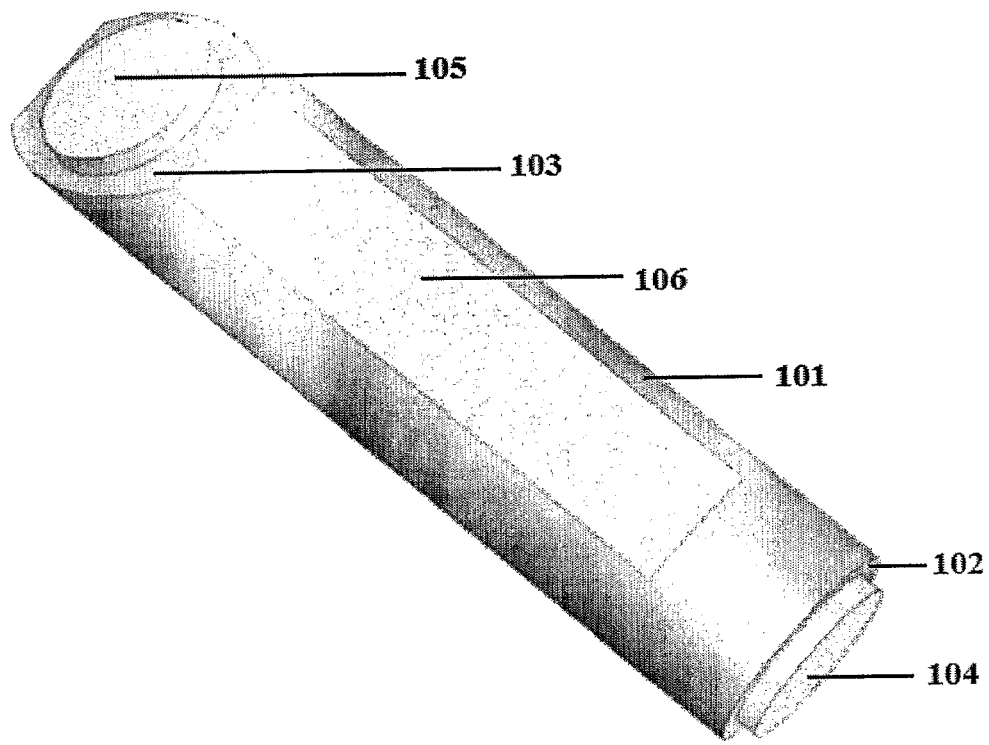
FIG. 1 is an isometric view of the hollow prism of the present invention.

The present invention provides a hollow prism for detecting liquid level through an optical beam from a source, including a hollow member sealed with dielectric members, with one of said dielectric member arranged at an inclined angle to the other and forming a leak-tight hollow space between the dielectric members. The optical beam emerging from the hollow prism remains either undeviated from the direction of optical beam that is entering into the hollow prism or suffers a deviation, depending upon whether the surface of the hollow prism from which the optical beam exits is in air or immersed in liquid respectively. The present invention also provides a fiber optic liquid level detector with the hollow prism of the present invention for detecting the liquid level.

DESCRIPTION OF THE INVENTION

The present invention provides a hollow prism with a characteristic refractive behavior for detection of level of a liquid, using a source of light to illuminate the hollow prism. The hollow prism of the present invention includes a hollow member with one of its ends cut normal to its axis, while the other end is cut at a substantial angle to the first. The respective ends of the cylinder, when sealed with a pair of thin-transparent or semi-transparent dielectric members to make them leak-tight for the liquid under test, trap a prismatic hollow space inside the hollow cylinder. This constitutes the hollow prism in the present invention. Such hollow prism exhibits a refractive behavior that highlights a characteristic relationship between the direction of the external optical beam that enters into the hollow member at normal incidence and its direction while emerging from it, after propagating through it along its axis. The optical beam emerging from the hollow prism either remains undeviated from the incident optical beam or suffers a deviation from it, depending upon whether the emerging surface of the hollow prism is in air or immersed in liquid respectively. The change in the optical beam direction, due to a 'gas to liquid' change or vice versa in the vicinity of the said hollow prism, can be readily discriminated with high efficiency and resolution, when a fiber optic receiver collects the optical beam emerging from the hollow prism. The fiber optic receiver in the present invention is used as a direction-filter.

Accordingly, the present invention provides a hollow prism having a refractive behaviour when it is held outside a liquid, such that an optical beam entering it through one of its shorter sides emerges 'undeviated' from its longest side. In other words, upon immersion in the liquid, the optical beam emerging from it suffers a deviation in its direction of emergence. The amount of deviation depends upon the refractive index of the liquid as well as the angle of the prism and is independent of the material used for the fabrication of the prismatic device.

Therefore, the principle that is employed for level detection in the hollow prism of the present invention is the change that occurs in the refractive behavior of the hollow prism under illumination from a light source, when the ambient environment of the hollow prism changes from gas to liquid and vice versa.

Figure 2:
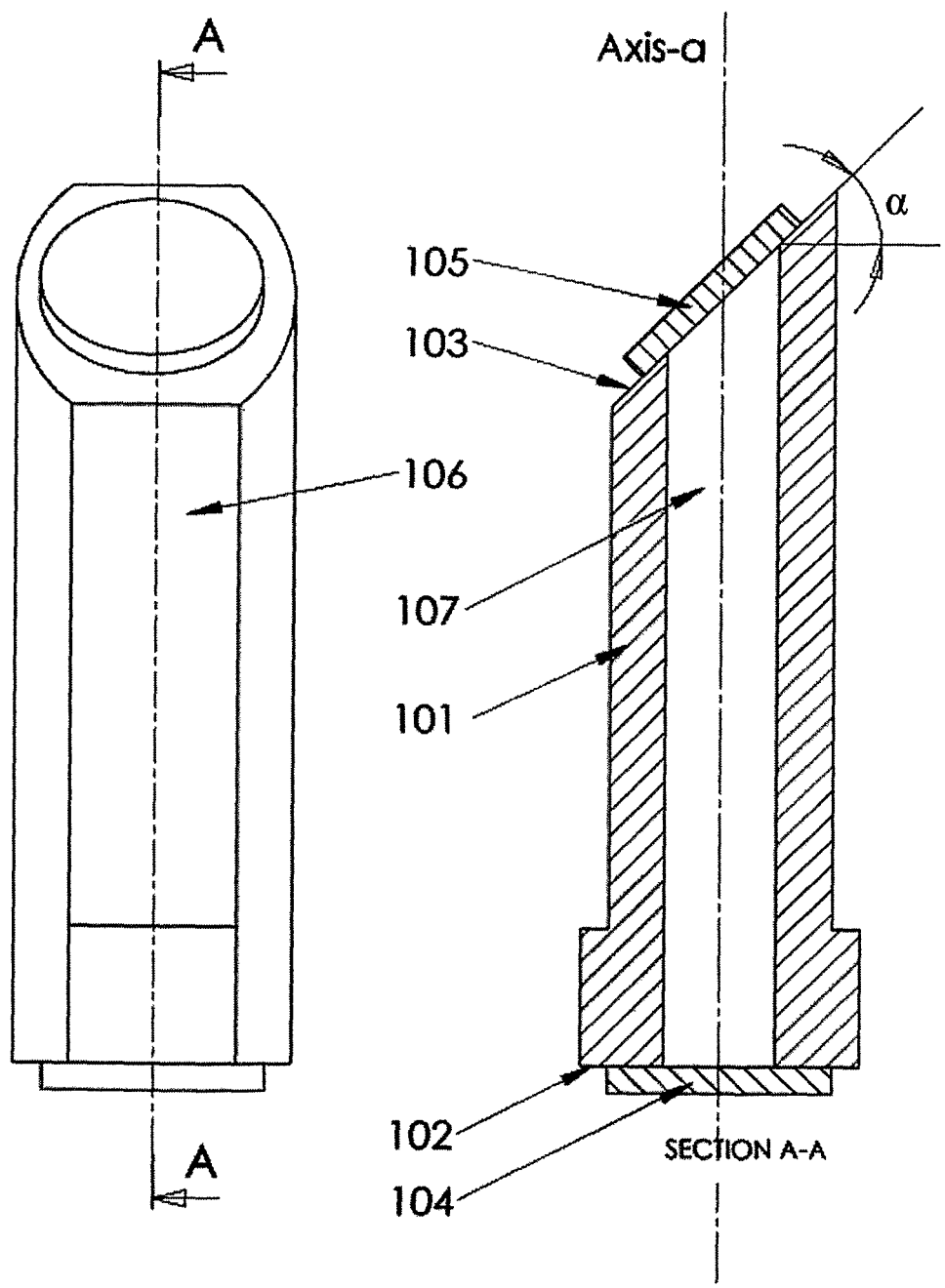
FIG. 2 is a front view and cross-sectional view of the hollow prism of the present invention.

The embodiments of the present invention are now described by referring to the accompanied drawings. FIGS. 1 and 2 of the drawings depict isometric view, front view, and cross sectional view of the hollow prism. The hollow prism includes a hollow member 101, which acts as housing for the hollow prism, as hereinafter described. The geometrical shape of the hollow member 101 is configured in a manner to possess a cylindrical symmetry. Terminal ends of the hollow member 101 constitute proximal and distal ends respectively, defined relative to the location from which an incident optical beam enters the hollow member 101. In the present invention, as an exemplary embodiment, the geometrical shape or configuration of the hollow member 101 is showed with cylindrical symmetry. However, it is within the purview of the present invention to use other suitable shapes or configurations, such as polygonal configuration for the hollow member 101. The hollow member 101 is made of an opaque/transparent, metallic or non-metallic material that is compatible with liquids for which the levels are to be detected. The compatibility factors are also reckoned on the basis of chemical and mechanical strength/resistance of the selected material of the hollow member 101 to the liquid used, as well as its temperature and pressure conditions. A flat surface 106 is provided on the surface of the hollow member 101 for arresting the movement of the hollow member 101, during liquid level sensing as hereinafter described.

The proximal end of the hollow member 101 is provided with a first planar surface 102, which is oriented so as to be normal to the geometrical axis 'a' of the cylindrical hollow member. An opening on this surface facilitates the entry of an optical beam from a light source into the hollow member 101.

The distal end of the hollow member 101 is also provided with a second planar surface 103. The second planar surface 103 is arranged to be inclined to the first planar surface 102 at an inclined angle 'α'. The value of the angle of inclination 'α' is selected based on the design parameters of the hollow prism such as the extent of deviation of optical beam required for a liquid of specific refractive index. The angle of inclination 'α' is selected from a wide range of prism angles and depends upon the refractive index of the liquid for which the liquid level is to be measured. Accordingly, the inclined angle 'α' can be set at an angle in the range of 10-70°, preferably in the range of 30-45°.

A dielectric member 104 is arranged on the first planar surface 102 of the hollow member 101 and is sealed leak-tight. Whenever, the hollow member 101 is immersed in a liquid during detection, the sealing arrangement prevents the liquid from entering into the hollow member 101 through the joint between the first dielectric member 104 and the first planar surface 102. Similarly, a second dielectric member 105 is also arranged on the second planar surface 103 and is sealed leak-tight to the second planar surface 103.

This arrangement of first and second dielectric members 104 and 105 ensures that the second dielectric member 105 which is arranged on the second planar surface 103, is positioned at the desired inclined angle 'α' relative to the first dielectric member 104.

The first and second dielectric members 104 and 105 are transparent or semi-transparent parallel plates or films made of diamond, sapphire, quartz, silicon, germanium, an amorphous fused quartz, borosilicate crown, poly methyl methacrylate (PMMA), poly vinyl chloride (PVC) or a combination thereof. The material for first and second dielectric members 104 and 105 can also be selected from any material that is transmissive to the applied optical beam and exhibits dielectric properties.

The thickness of the second dielectric member 105 is determined based on the mechanical strength requirement under the operating conditions of liquid level sensing including working temperature, pressure and the reactivity of the liquid with the dielectric member 105. The thickness of second dielectric member 105 can be suitably varied and is in the range of 100 microns (μ) to 1 mm. However, it is to be understood here that the thickness factor is not a constraint and dielectric members 104 and 105 of any suitable thickness can be adopted in the present invention and the hollow prism of the present invention is used for liquid level sensing with dielectric members of reduced thickness.

In the present invention the surfaces of the first and second dielectric members 104 and 105 are polished so as to make them transparent to the optical beam passing through them. However, the surfaces of first and second dielectric members 104 and 105 are not required to be optically finished for high surface accuracy.

The dielectric members 104 and 105 when sealed onto the first and second planar surfaces 102 and 103 respectively trap between them a leak-tight prismatic hollow space 107.

The characteristics of the hollow prism remain unaltered if the sealed hollow space 107 is filled with air at normal temperature and pressure or evacuated to contain vacuum. It is ensured that liquid does not enter into the sealed hollow space 107, when the hollow member 101 is immersed into a liquid medium 113 for level detection.

Figure 3:
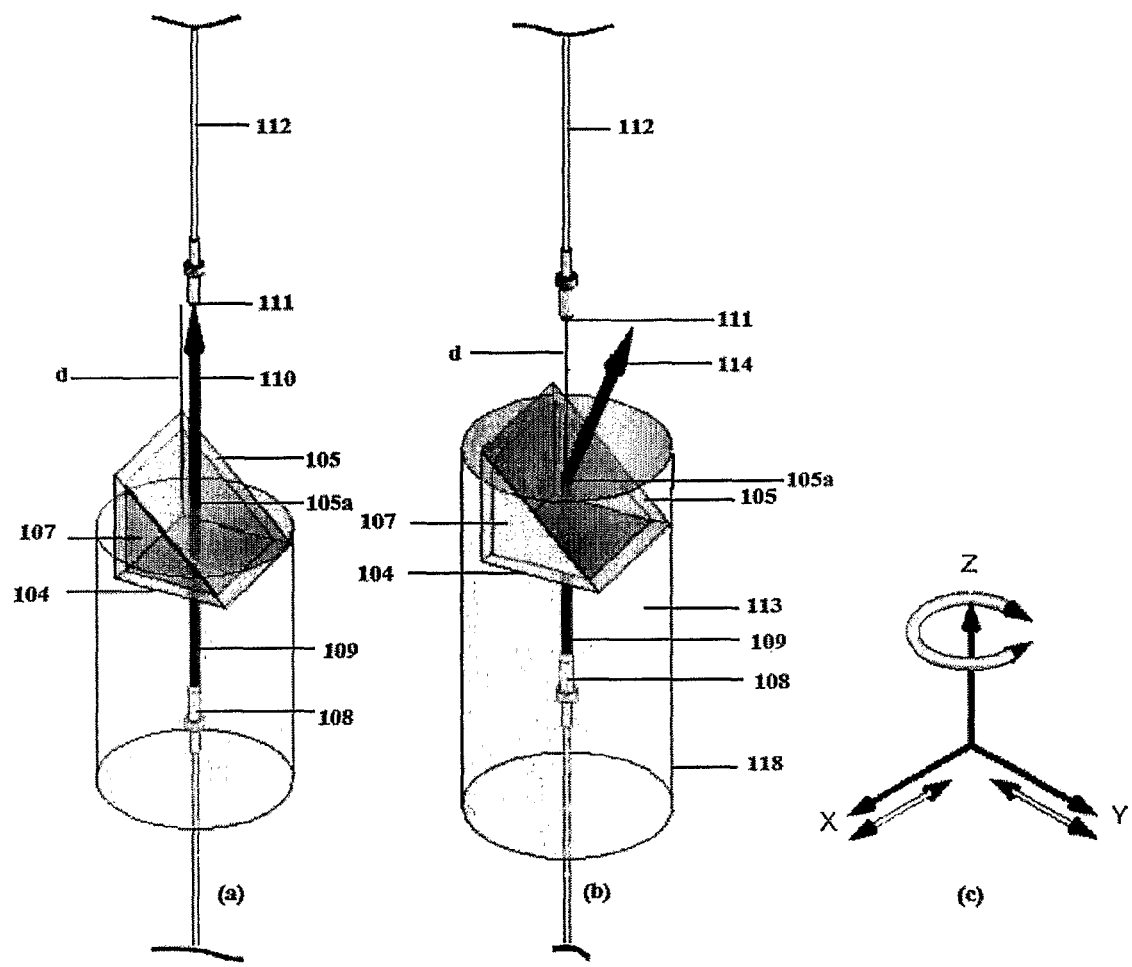
FIG. 3($a$), ($b$) are conceptual views of the hollow prism of the present invention depicting the emergence of undeviated optical beam while not placed in liquid medium and deviated optical beam when immersed in the liquid medium.

FIG. 3 is a conceptual description for the hollow space 107 trapped between the first and second dielectric members 104 and 105 inside the hollow member 101. The first dielectric member 104 of the hollow prism corresponds to the shorter side of the hollow prism through which an incident optical beam 109 from a selected light source enters the hollow prism at normal incidence. The second dielectric member 105 corresponds to the longest side of the hollow prism wherein the emerging optical beam 110 enters into 105 at angle of incidence of 'α'.

Accordingly, the internal surfaces of the first and second dielectric members 104 and 105 along with the sealed hollow space 107 specifically correspond to the hollow prism or prismatic device of the present invention.

In the present invention, as an exemplary embodiment, the geometrical shape of the hollow member 101 is shown as cylindrical. However, the shape of the hollow member 101 can vary as long as the hollow member 101 with the first dielectric member 104 is positioned as its shorter side to permit entry of the incident optical beam 109 from the selected light source and the second dielectric member 105 is positioned as its longest side for exiting the corresponding emerging optical beam 110 and the second dielectric member 105 arranged at an inclined angle relative to first dielectric member 104.

In the present invention, the size and volume of the sealed hollow space 107 do not alter the operational efficiency and hence can be varied, depending upon the fabrication considerations of the hollow member 101. Accordingly, the sealed hollow space 107 forms a leak-tight prismatic hollow space filled with air or vacuum. The volume of the optical material present in the level sensing region can be reduced, if need arises, to micro-liters.

FIG. 3(a) depicts a conceptual view of the hollow prism of the present invention showing the incidence of an optical beam 109 from a light source. The hollow prism as shown in FIG. 3 includes the first and second dielectric members 104 and 105, which form the shorter and longest sides of the hollow prism respectively with a leak-tight sealed hollow space 107. A fiber optic transmitter 108, which is a multimode optical fiber, transports monochromatic incident optical beam 109 from a light source. A multi-mode silicon glass fiber of 50/125 microns is used for transmission and receiving of the optical beam. Other compatible fiber optic elements such as polymer, quartz, sapphire etc., operating either in single mode or in multimode can also be suitably used depending upon the specific nature of the liquid that is used for level sensing. The light source can be a laser or a light emitting diode or any light source in the visible to infrared range. In the present invention, a 5 mW, 633 nm wavelength laser diode is used as input light source for the hollow prism through the fiber optic transmitter 108. The optical beam is collimated; whenever the optical beam emerging from the multimode fiber diverges excessively, by using a suitable lens. A fiber optic receiver 112 with 50 microns core size is arranged co-axial to that of the fiber optic transmitter 108, as shown in the FIG. 3. The fiber optic receiver 112 functions as a direction filter. It is understood here that the core size of the fiber optic receiver 112 can be suitably varied.

The co-axial positioning of the fiber optic transmitter and receiver 108 and 112 facilitates the incident optical beam 109 emerging from the fiber optic transmitter 108 to be received by the fiber optic receiver 112, whenever the incident optical beam 109 propagates through the hollow prism coaxially and emerges as an undeviated optical beam 110, in the absence of liquid 113.

Spatial separation distance 'd' between critical point of exit surface 105a of the second dielectric member 105 and critical point of receiving surface 111 of the fiber optic receiver 112, is determined on the basis of the minimum refractive index of the liquid, for which the hollow prism is used for level detection. The determination of spatial separation distance 'd' is hereinafter described.

A photo detector 141, as hereinafter described, is connected to the fiber optic receiver 112 and a Controller 142 that transmits ON/OFF type signals depending upon exposure of the hollow prism to gaseous or liquid phases respectively.

FIG. 3(b) depicts a conceptual view of the hollow prism immersed in liquid medium 113 showing the manner in which the incident optical beam 109 from a light source is transmitted by the hollow prism. The hollow prism as shown in FIG. 3(b) includes the first and second dielectric members 104 and 105, which form the shorter and longest sides of the hollow prism respectively with a leak-tight sealed hollow space 107. The fiber optic transmitter 108 transports monochromatic incident optical beam 109 to the hollow prism. The fiber optic receiver 112 with a critical point of the receiving surface 111 is positioned at the distance 'd' from a critical point 105a on the exit surface of the hollow prism and lies coaxial to the fiber optic transmitter 108. The coaxial positioning of the fiber optic transmitter and receiver 108 and 112 facilitates the detection of non-receipt of the optical beam exiting from the point 105a of the hollow prism as a deviated emerging optical beam 114.

Controller 142, as hereinafter described, connected to the farther end of the fiber optic receiver 112, detects the changes in the output-status of a photo detector 141, evaluates whether the optical beam emerging from the hollow prism is of undeviated type 110 or of the deviated type 114 and activates a display correspondingly to indicate whether the hollow prism is in air or inside the liquid whose level is changing.

The refractive behavior of hollow prism of the present invention is that when the hollow prism is held outside the liquid medium as shown in FIG. 3(a), the optical beam entering it through one of its shorter sides emerges 'undeviated' from its longest side. Upon immersion in the liquid, as shown in FIG. 3(b), the optical beam emerging from it suffers a deviation in its direction of emergence.

FIG. 3(c) depicts possible degrees of freedom for motion of the hollow prism along and about reference axes of the sensor. The hollow prism has one possible degree of freedom of rotation about the z-axis and three possible degrees of freedom of linear displacement along each of the x, y and z axes in the reference frame. This implies that the hollow prism, of the present invention need not be rigidly connected to the fiber optic conduits with a fixed distance between the fiber optical conduits and bearing a fixed initial relation to the critical point on the exit surface of the hollow prism. Its operation remains unaltered even if the hollow member 101 is allowed to move as a float along with the level of the liquid. To measure liquid level with such an arrangement, the float needs to be stopped at any desired location through a convenient mechanism. Therefore, the hollow prism can move freely and linearly as a float along with the level of the liquid and gets arrested at a location where liquid level needs to be measured.

The selected liquid 113 can be a non-cryogenic liquid or a cryogenic liquid. The liquids that can be used in the present invention include a wide variety of liquids with different refractive indices, without limitation, viz., water, milk, liquid propellants, liquid hydrogen, liquid oxygen, liquid nitrogen, toxic fluids, alcohols, oils, kerosene, and petroleum products (with refractive indices from 1.1 to 1.7).

The amount of deviation of optical beam, when the hollow prism is immersed in liquid, depends upon the refractive index of the liquid medium 113 and is independent of the material used for the fabrication of the prismatic device. The hollow prism of the present invention therefore depends only on the refractive index of the selected liquid 113 and not on other conditions of the liquid such as temperature and pressure, which change dynamically, particularly in cryogenic liquid environments. In other words, refractive behavior of the hollow prism of the present invention is insensitive to ambient conditions of temperature and pressure. This property reflects and leads to a specific advantage of level sensing using hollow prism where the fiber optic receiver 112 need not be repositioned whenever the ambient conditions such as pressure and temperature of the liquid under test undergoes dynamic changes during level detection.

Figure 4:
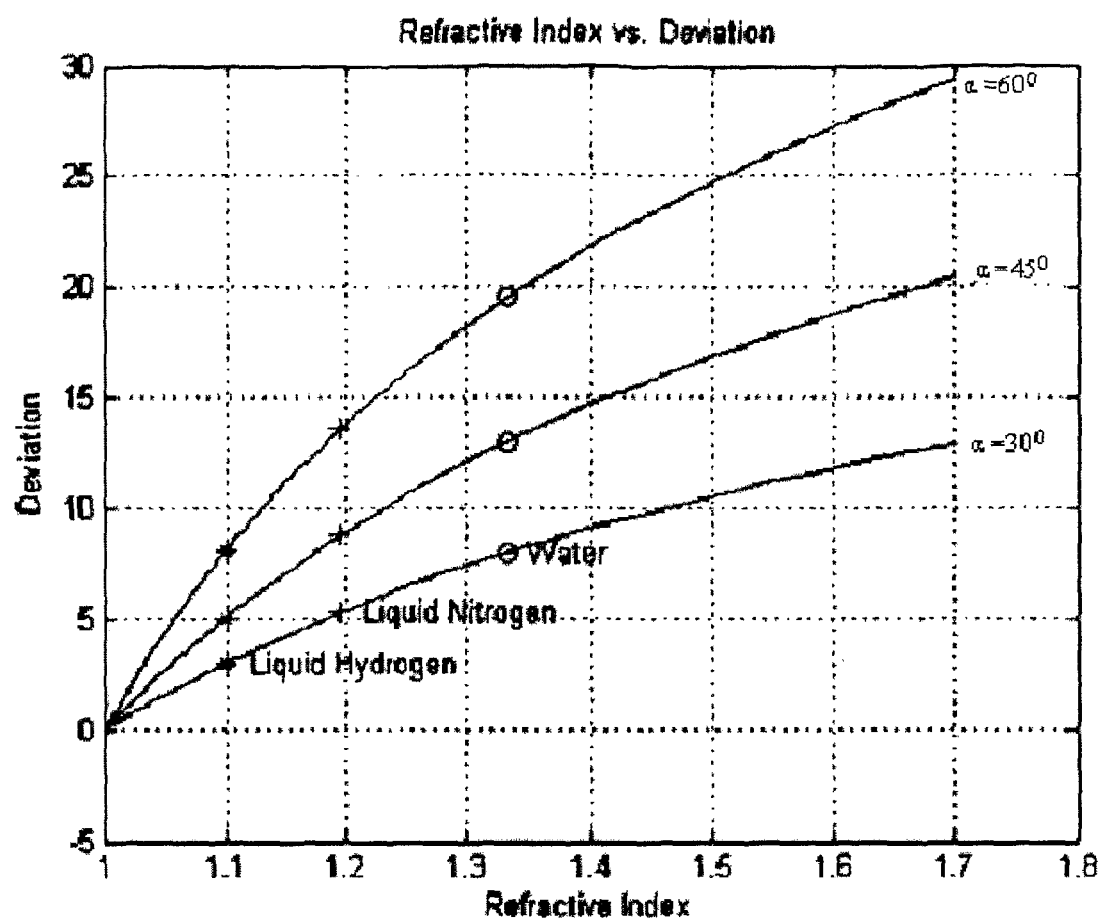
FIG. 4 is a graphical representation of the plots showing the deviation of an emergent optical beam plotted against the refractive indices of liquids, for the specific prism angles of 30°, 45° and 60° respectively.

FIG. 4 is a graphical plot for variation of the angular deviation of the beam 114 with refractive index of the medium 113 in the range of 1-1.7. The same figure also depicts the influence of the prism angle on such relationship. As an exemplary embodiment, the estimates for the expected deviation angle when liquid hydrogen, liquid nitrogen and water with corresponding refractive indices of 1.1, 1.195 and 1.33 respectively represent the medium 113 are given below. At $\alpha=30°$, liquid hydrogen when detected with the fiber optic level detector 117 (shown in the FIG. 8) of the present invention, the deviated optical beam 114 as shown in the FIG. 3 goes through a deviation of 2.5°,while the same beam while detecting the levels of liquid nitrogen and water deviates through angles of 5° and 7.5° respectively. In case, the inclined angle is increased, the corresponding deviation angles also exhibit a corresponding increase in magnitude. A knowledge of such estimates for the deviation angle will help in fixing the spatial distance 'd' between the critical point of the exit surface 105a and the critical point of receiving surface 111 of the fiber optic liquid level detector 117. Therefore, fiber optic level sensor 117, as hereinafter described, of the present invention can be used to detect the liquid levels of different liquids with variable refractive indices, when the refractive index of the liquid is above a critical value fixed by the distance 'd'.

The spatial separation distance 'd' can be designed to effect level detection in all liquids having a refractive index 1.1 and above, producing a deviation as low as 2.5°,with the angle $\alpha=30°$. For instance, for liquid Hydrogen with refractive index 1.1, producing a deviation of 2.5° (with $\alpha=30°$), if the designed horizontal deviation at the critical point of receiving surface 111 is 5 mm, then tan(2.5°) is equal to 5/d, or d×tan(2.5°)=5, from which 'd' in mm is calculated.

Therefore, the magnitude of the optical beam deviation introduced by the hollow prism, when it is immersed in liquid, is totally decided by the refractive index of the selected liquid 113 under measurement and the appropriate angle of the prism only.

Figure 5:
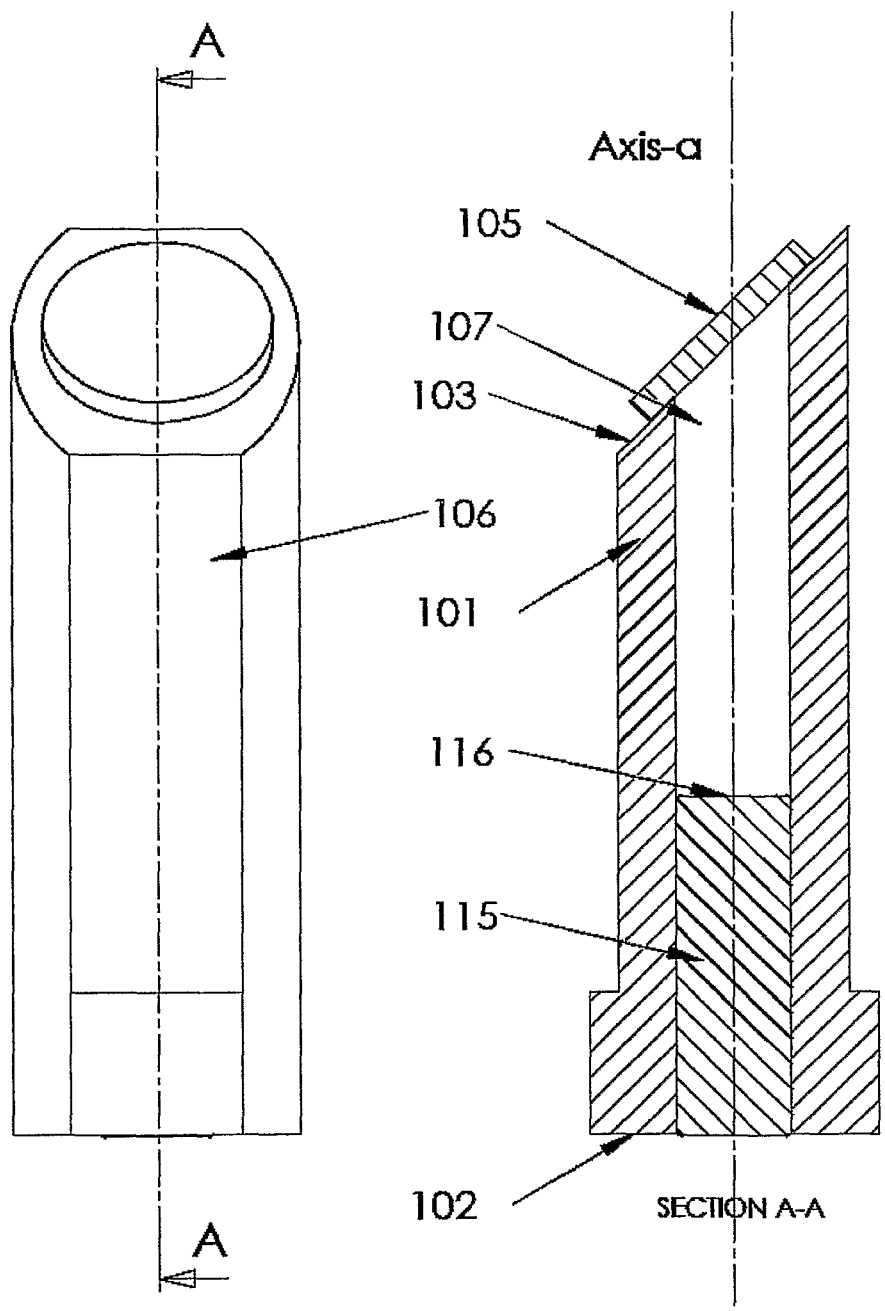
FIG. 5 is a front view and cross-sectional view of the hollow prism along with an integrated collimating lens.

FIG. 5 is a front view and cross-sectional view of the hollow member 101. In this embodiment, the dielectric member 104 is replaced with a collimating lens 115 of a cylindrical geometrical shape. The internal diameter of the hollow member 101 and the outside diameter of the collimating lens 115 are matched to close tolerance. The collimating lens 115 is positioned coaxially inside the hollow member 101 such that the bottom planar end of the lens is flush with the surface 102. When the space between the wall of the collimating lens and the internal surface of the hollow member 101 is sealed for leak-tightness, a leak-tight prismatic space is trapped between the top planar surface 116 of the collimating lens and the dielectric member 105. This constitutes the hollow prism in this embodiment. In this embodiment, the hollow prism becomes tolerant to small changes in the divergence of the optical beam emerging from the fiber optic transmitter 108. (It however requires that, the distance between the fiber optic transmitter 108 and the planar surface of the collimating lens 116 in flush with the first planar surface 102 is fixed) please delete this sentence.

Figure 6:
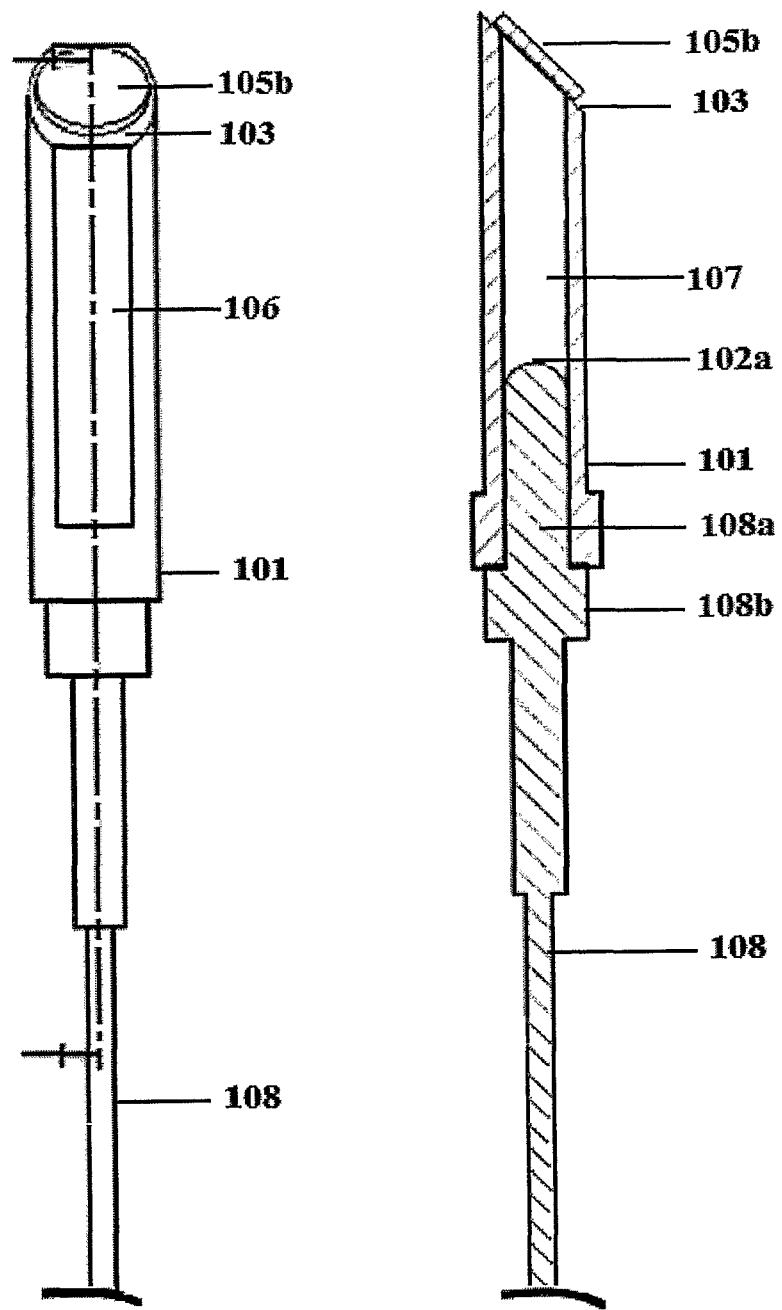
FIG. 6 depicts a front view and cross-sectional view of the hollow prism of the present invention along with an integrated fiber optic transmitter.

FIG. 6 depicts the front view and cross-sectional view of another embodiment of the hollow prism of the present invention. The hollow prism is integrated directly with the fiber optic transmitter 108 at the proximal end of hollow member 101 as shown in the FIG. 6. The free end of the fiber optic transmitter 108 is terminated in a ferrule 108a and metal cap 108b both of which are cylindrically shaped. The outside diameter of the ferrule 108a and the inside diameter of the hollow member 101 are matched to close tolerance. The ferrule 108a is positioned coaxially and sealed for leak-tight condition near the proximal end of the hollow member 101. The ferrule 108a in this invention is made of ceramic material and any other suitable material can also be used as a ferrule or cap. In this embodiment, fiber optic transmitter 108 with its top surface forming first planar surface 102a, is arranged in lieu of the first dielectric member 104 and acts as shorter side of the hollow prism and the second dielectric member 105 with its inclined angle, acts as longest side of the hollow prism, from where the optical beam emerges out from the hollow prism. In other words, the hollow space 107 is now trapped between top planar surface of fiber optic transmitter 102a and the dielectric member 105b. In this embodiment fiber optic transmitter 108 is made using a single mode fiber. Such fiber outputs an optical beam, which remains substantially unidirectional over the distance 'd', and hence does not require an additional collimating lens for an efficient operation.

Figure 7:
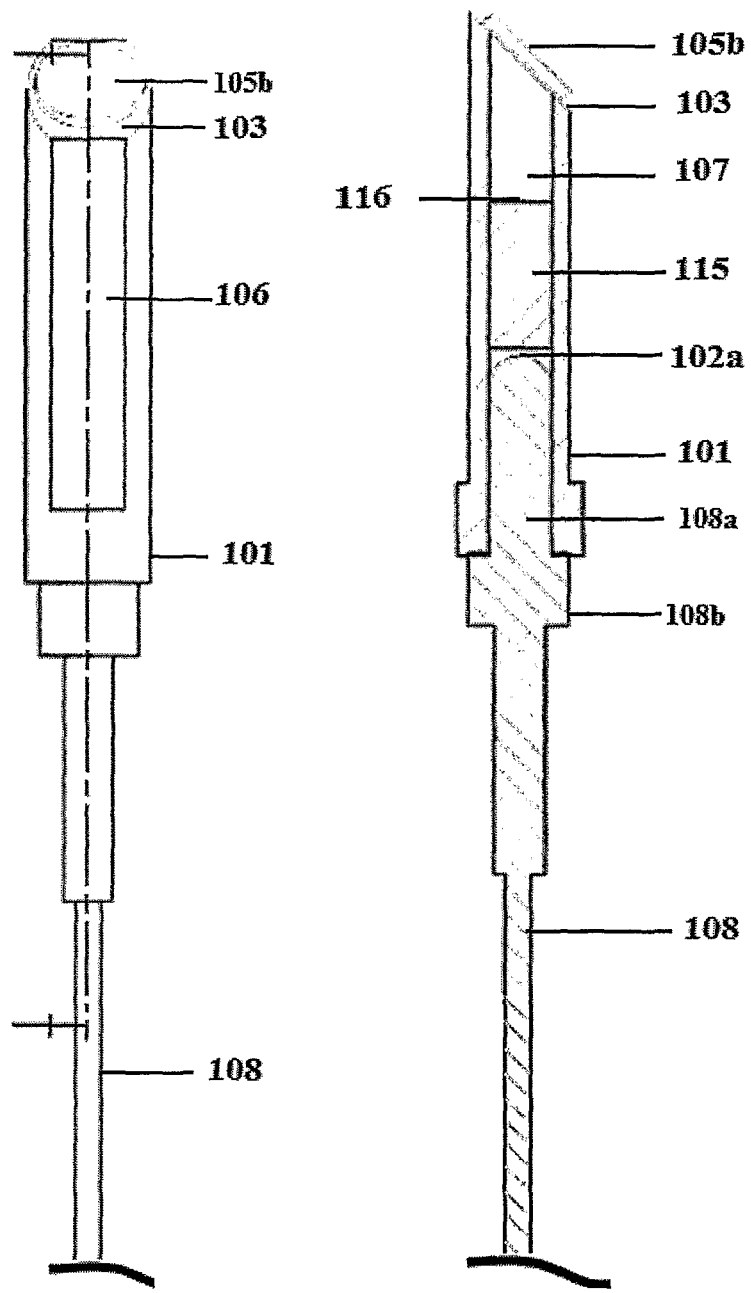
FIG. 7 depicts a front view and cross-sectional view of the hollow prism along with an integrated fiber optic transmitter and collimating lens.

FIG. 7 depicts the front view and cross-sectional view of the yet another embodiment of the hollow prism of the present invention. In this embodiment an additional collimating lens 115 interposed coaxially in the hollow space between the top planar surface of fiber optic transmitter 102a of the fiber optic transmitter 108 and the dielectric member 105b. The fiber optic transmitter 108 disposed in a ceramic ferrule 108a (not shown in figure) is fitted through the opening of the proximal end of the hollow member 101. The fiber optic transmitter 108 is leak-tight sealed to the proximal end of the hollow member 101. It is also an embodiment of the present invention wherein a collimating lens 115 is arranged between the fiber optic transmitter 108 and the dielectric member 105b in order to collimate the optical beam from the fiber optic transmitter 108. The top surface 116 of the collimating lens 115 now serves in lieu of the first dielectric member 104 and acts as shorter side of the hollow prism and the dielectric member 105b acts as longest side of the hollow prism, from where the optical beam emerges. The collimating lens 115 as used in the present invention is cylindrically shaped lens with fixed focal length or a Gradient Index lens of length 6 mm, diameter 2 mm and focal length 2 mm. However, it is to be considered here that the specifications of the collimating lens 115 provided here are indicative in nature and not a limiting factor.

The present invention also provides a fiber optic liquid level detector with a hollow prism for detecting liquid level, in the presence of a light source 120, which is now described by referring to FIG. 8-14. The liquid level detector 117 includes the hollow prism of the present invention and arranged in a sealed tank or container 118 filled with desired liquid 113 with surface level shown as 119, for which the liquid level is to be detected.

The tank 118 is sealed with a lid 121. A light source 120 is connected to transmit an optical beam for the hollow prism of the liquid level detector 117 through the fiber optic transmitter 108. The fiber optic receiver 112 is connected to Controller 142 through photo detector 141 for detecting the presence or absence of the optical beam from the fiber optic receiver 112. The fiber optic receiver 112 is arranged to receive the undeviated optical beam when liquid is not present and does not receive the deviated emergent beam when liquid is present. The fiber optic receiver 112 is coupled to the photo detector 141, to generate ON/OFF type electrical voltage or current signal, so as to indicate that the hollow prism is inside either gaseous or liquid environment respectively and to facilitate remote regulation and control during filling/draining operations of any liquid. It is also possible to configure a level detection system using the liquid level detector of the present invention, to continuously monitor level, over a limited height of the column of the liquid under measurement.

Figure 9:
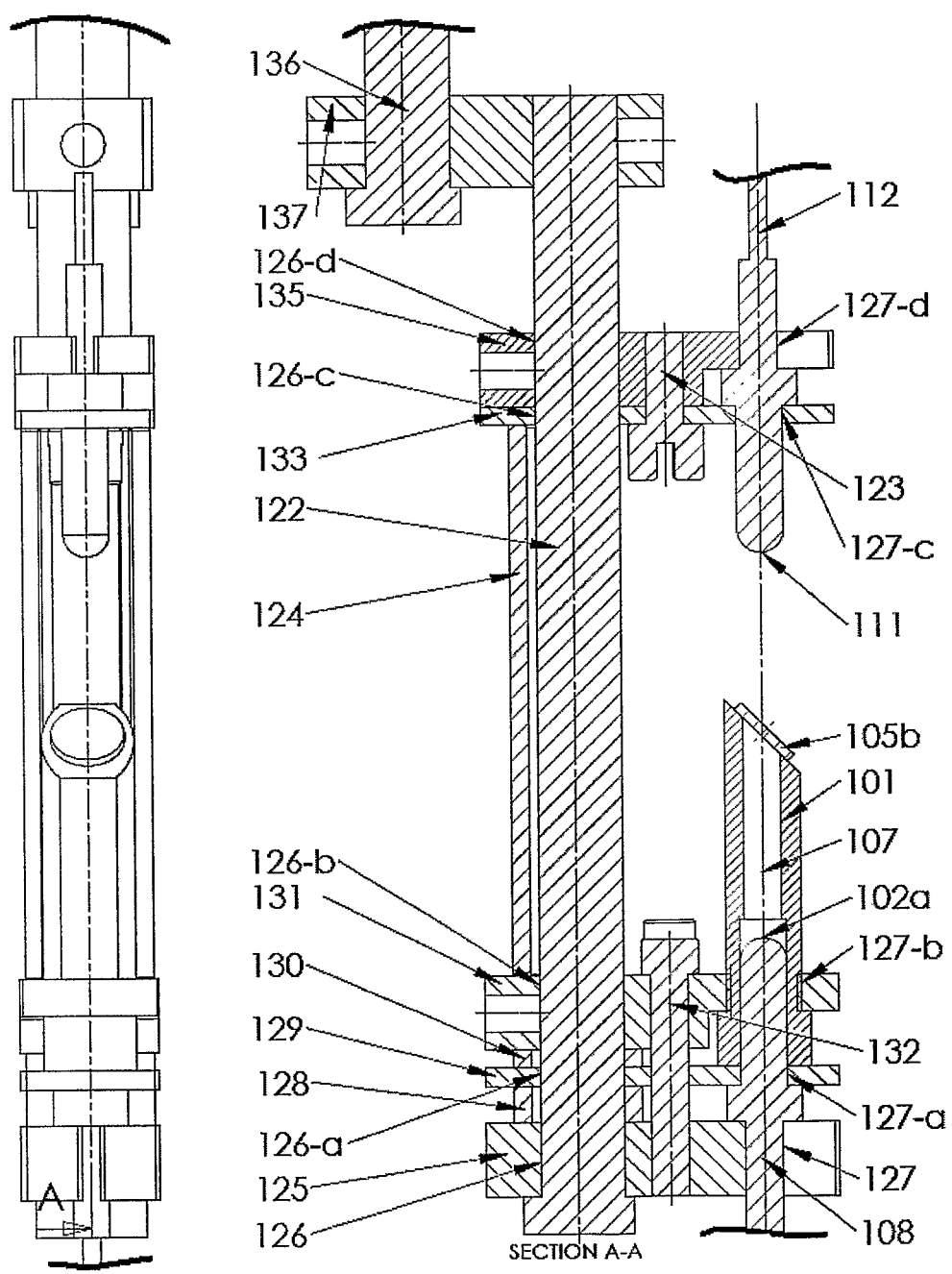
FIG. 9 is a front view and cross sectional view of fiber optic liquid level detector of the present invention along with the hollow prism without collimating lens.

FIG. 9 is a front view and cross sectional view of the liquid level detector 117, including a supporting member 122, which is a rod or beam-like structure to support other associated parts of the liquid level detector 117. A fiber optic transmitter holder 125 having a pair of openings 126 and 127 is connected to the supporting member 122 through the opening 126. The fiber optic transmitter 108 is permeably arranged to pass through the opening 127 of the fiber optic transmitter holder 125, which effectively arrests the translatory motion of the fiber optic transmitter 108 in x-y plane. A fixture 129 has a pair of openings 126a and 127a. It is connected to the supporting member 122 through the opening 126a. The same fixture is also connected to the fiber optic transmitter 108 through the opening 127a. The fixture 129 effectively arrests the translatory motion of the fiber optic transmitter 108 along z-axis. Spacer element 128 mounted on the supporting member 122 helps to keep the fixture 129 parallel to the fiber optic transmitter holder 125. Fixture 131 has a pair of openings 126b and 127b. It is connected to the supporting member 122 through opening 126b and to the hollow member 101 through the opening 127b. The spacer element 130 mounted on the supporting member 122 helps to keep the fixture 131 parallel to the fixture 129. A fastener 132 is used to connect firmly the hollow member 101 along with above-stated connecting elements to the supporting member 122. A flat portion 106 is provided on the surface of the hollow member 101 to arrest the rotational movement of the hollow member 101.

It may be noted that the hollow member 101 shown in the FIG. 9 does not contain the collimating lens 115.

A distance regulator 124 with proximal and distal ends is mounted on the supporting member 122. The distance regulator 124 is a sleeve or spacer of variable length. The fixture 133 is fiber optic receiver holder and has a pair of openings 126c and 127c. It is connected to the supporting member 122 through the opening 126c. The fiber optic receiver 112 is permeably connected to the fixture 133 through the opening 127c. The fixture 133 is also arranged to rest on the distal end of the distance regulator 124. The fixture 133 not only holds the fiber optic receiver 112 coaxial to the fiber optic transmitter 108 but also prevents the fiber optic receiver 112 from undergoing any translatory motion in the x-y plane. The distance regulator 124 is a spacer arranged to fix the distance 'd' between critical point of exit surface 105a (105b???) of the second dielectric member 105 and critical point of receiving surface 111 of the fiber optic receiver 112.

A fixture 135 having a pair of openings 126d and 127d, is connected to the supporting member 122 through the opening 126d. It is also connected to the fiber optic receiver 112, through the opening 127d. Fixture 135 is used to arrest the translatory motion of the fiber optic receiver along z-axis. The spacer 134 mounted on the supporting member 122 helps to hold the fixtures 133 and 135 parallel to each other. A fastener element 123 is used to fasten the fixtures 133 and 135. The fiber optic receiver 112 is connected to a Controller 142 through photo detector 141. The Controller 142 processes the signals as detected by the photo detector 141 to evaluate the presence or absence of the optical beam at the photo detector 141 during the liquid level detection.

A holding member 136 is connected to the supporting member 122 through a fixture 137 to act like an anchor and used to suspend the liquid level detector 117 in the tank 118.

Figure 8:
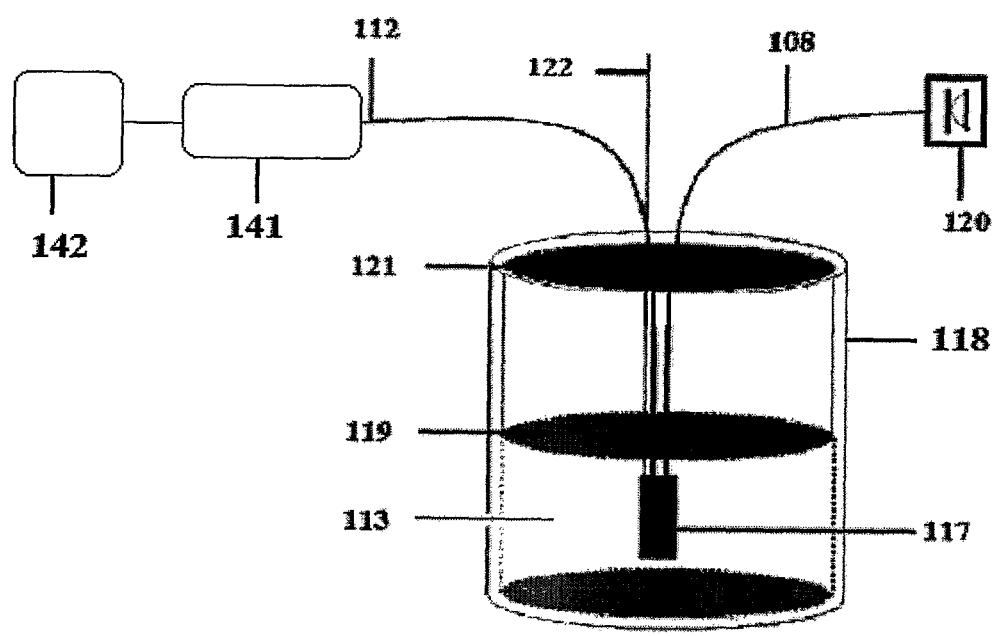
FIG. 8 is a diagrammatic view of fiber optic liquid level detector of the present invention with the hollow prism held at a fixed position in a tank.
Figure 10:
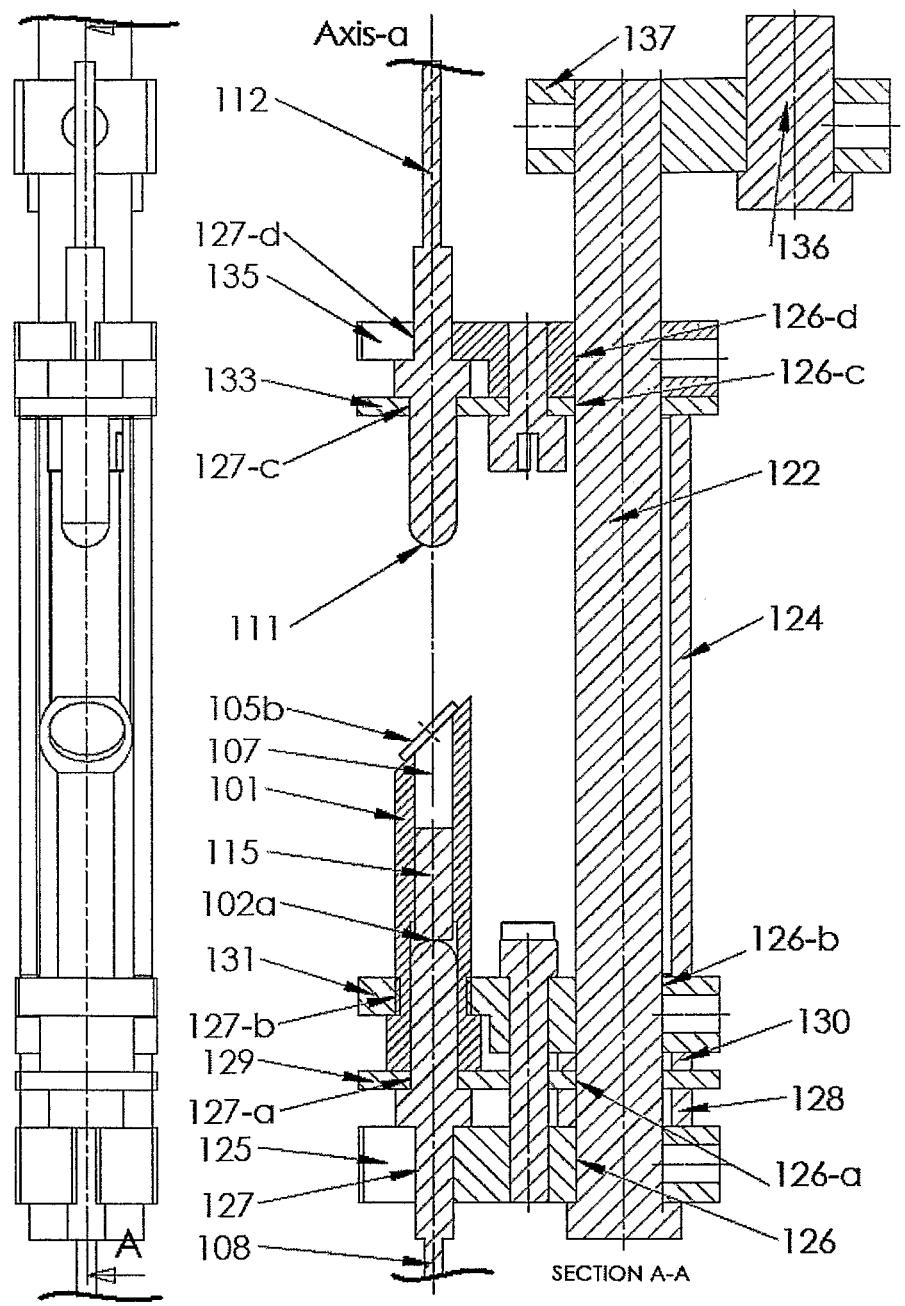
FIG. 10 is a front view and cross sectional view of fiber optic liquid level detector of the present invention along with the hollow prism and collimating lens.

FIG. 10 is a front view and cross sectional view of the liquid level detector 117 as depicted in FIG. 8, wherein hollow member 101 of the liquid level detector contains a collimating lens 115. In all other aspects its construction is similar to that shown in the FIG. 9.

Figure 11:
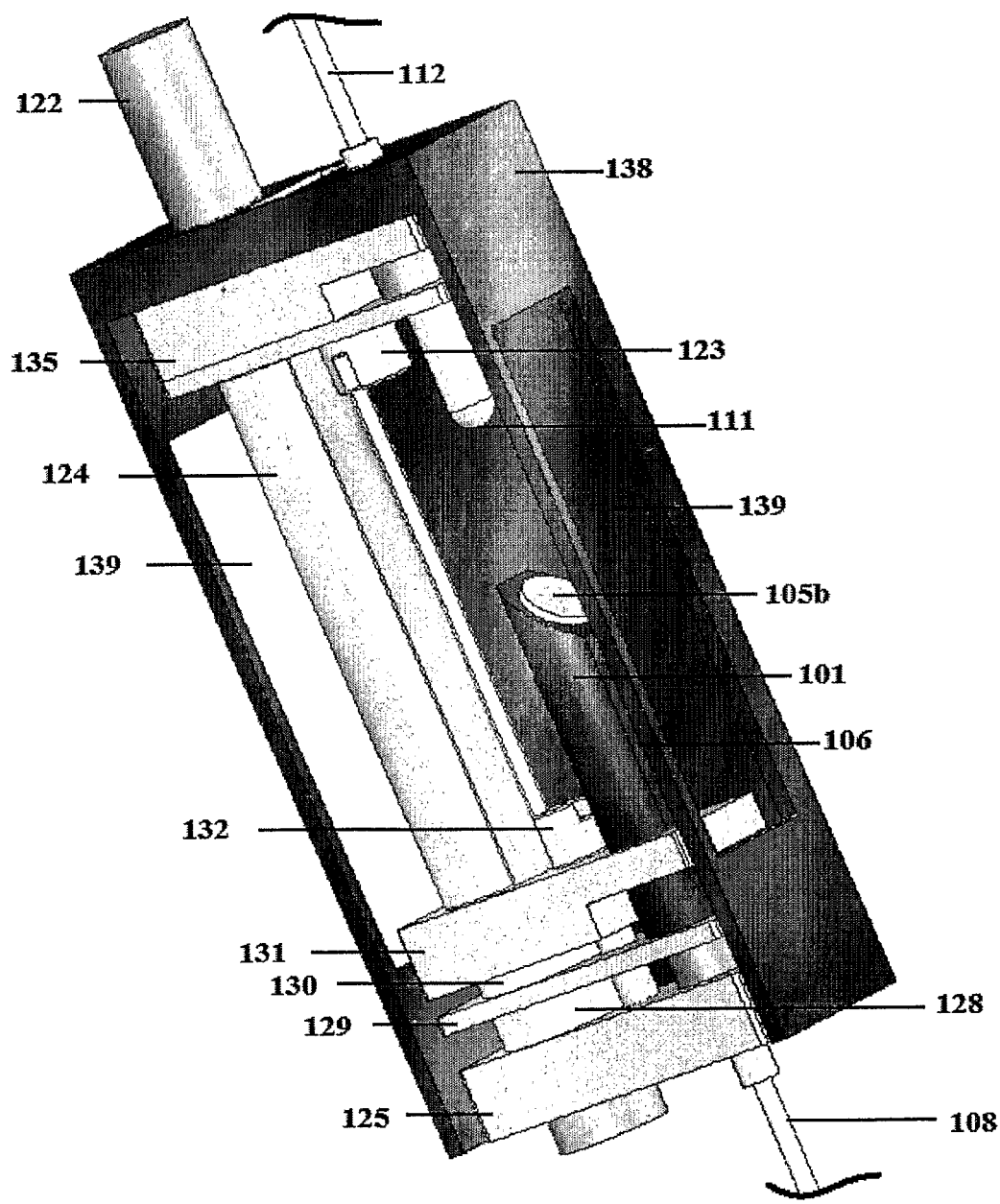
FIG. 11 is an integrated view of the fiber optic liquid level detector of the present invention enclosed in housing.

FIG. 11 is an integrated view of the liquid level detector 117 enclosed in housing 138 with openings 139 for the passage of the liquid into the housing 138 during liquid level detection.

Figure 12:
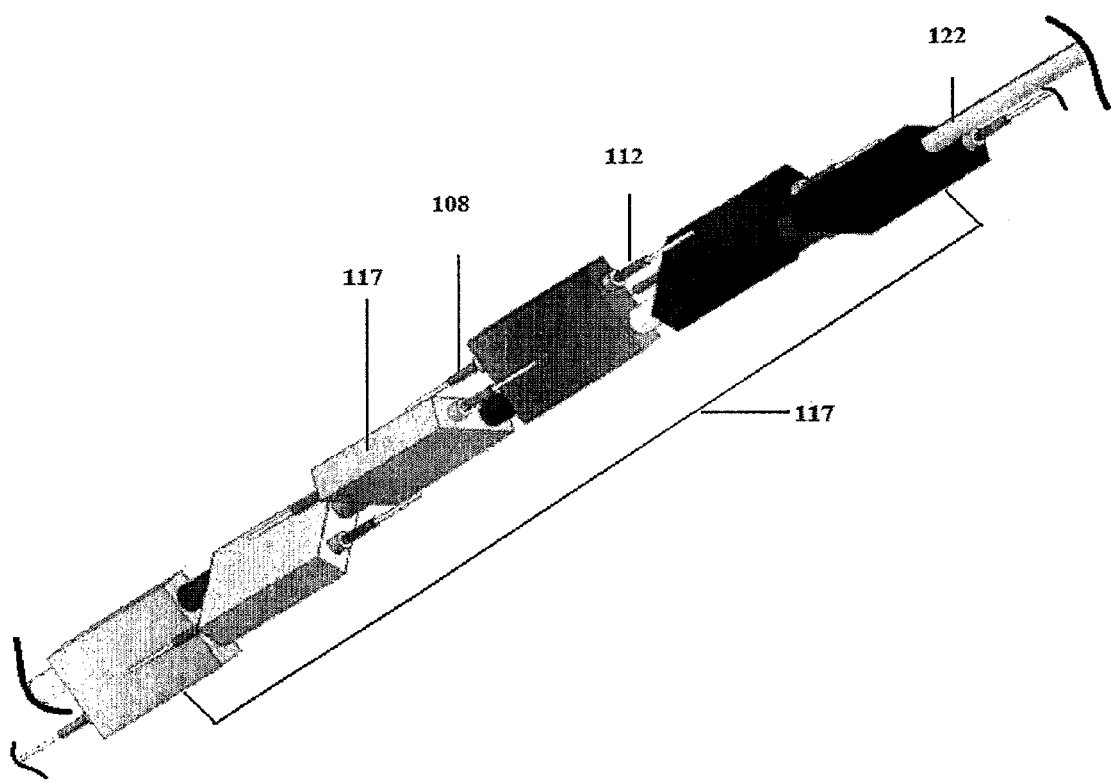
FIG. 12 depicts an array of six fiber optic liquid level detectors of the present invention.

FIG. 12 depicts, an array of six fiber optic liquid level detectors each of them identical in construction to 117 and disposed at different spatial locations and in series in a tank having a liquid 113, for detecting the liquid levels at the corresponding multiple locations in the tank 118. A large number of arrays of such fiber optic liquid level detectors 117 can also be arranged for detecting the liquid level with different spatial resolution at any region of the tank 118.

Figure 13:
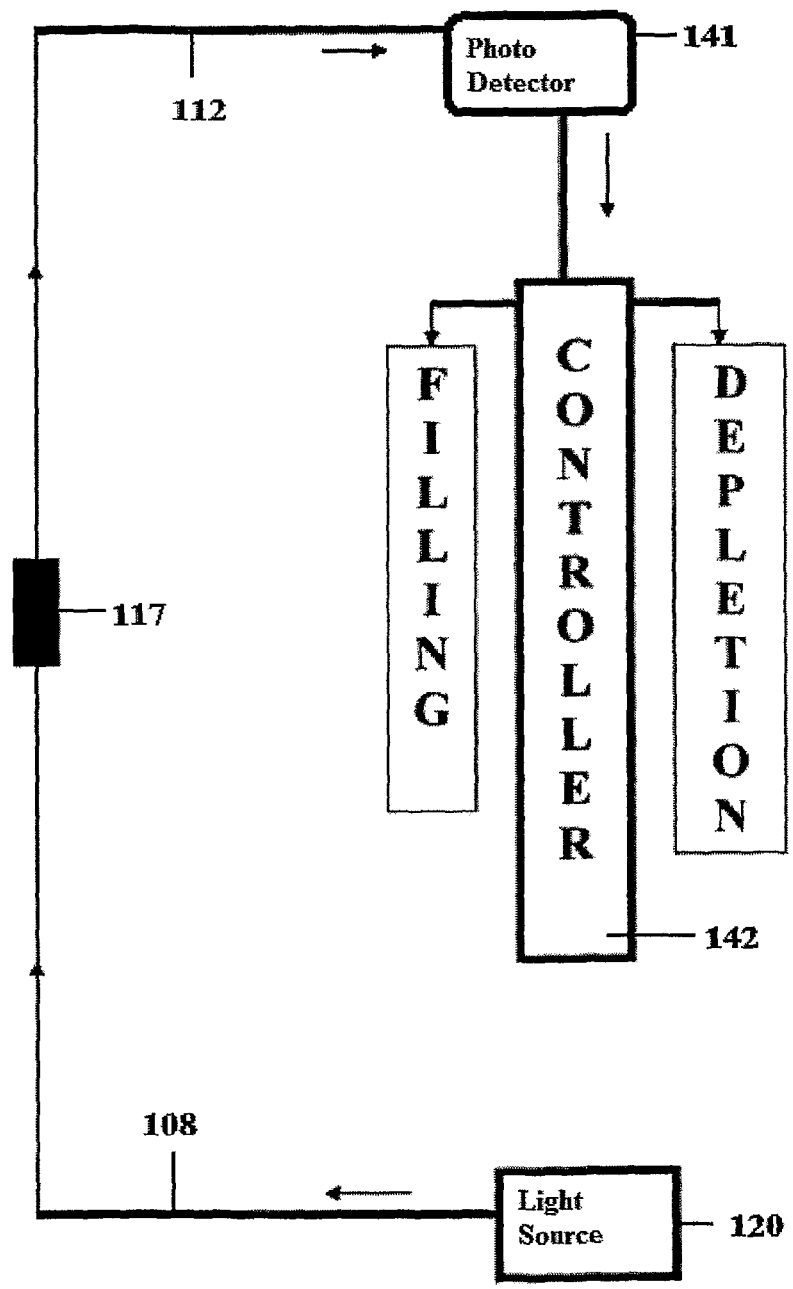
FIG. 13 is a block diagram of the fiber optic liquid level detector of the present invention connected to a Controller.
Figure 14:
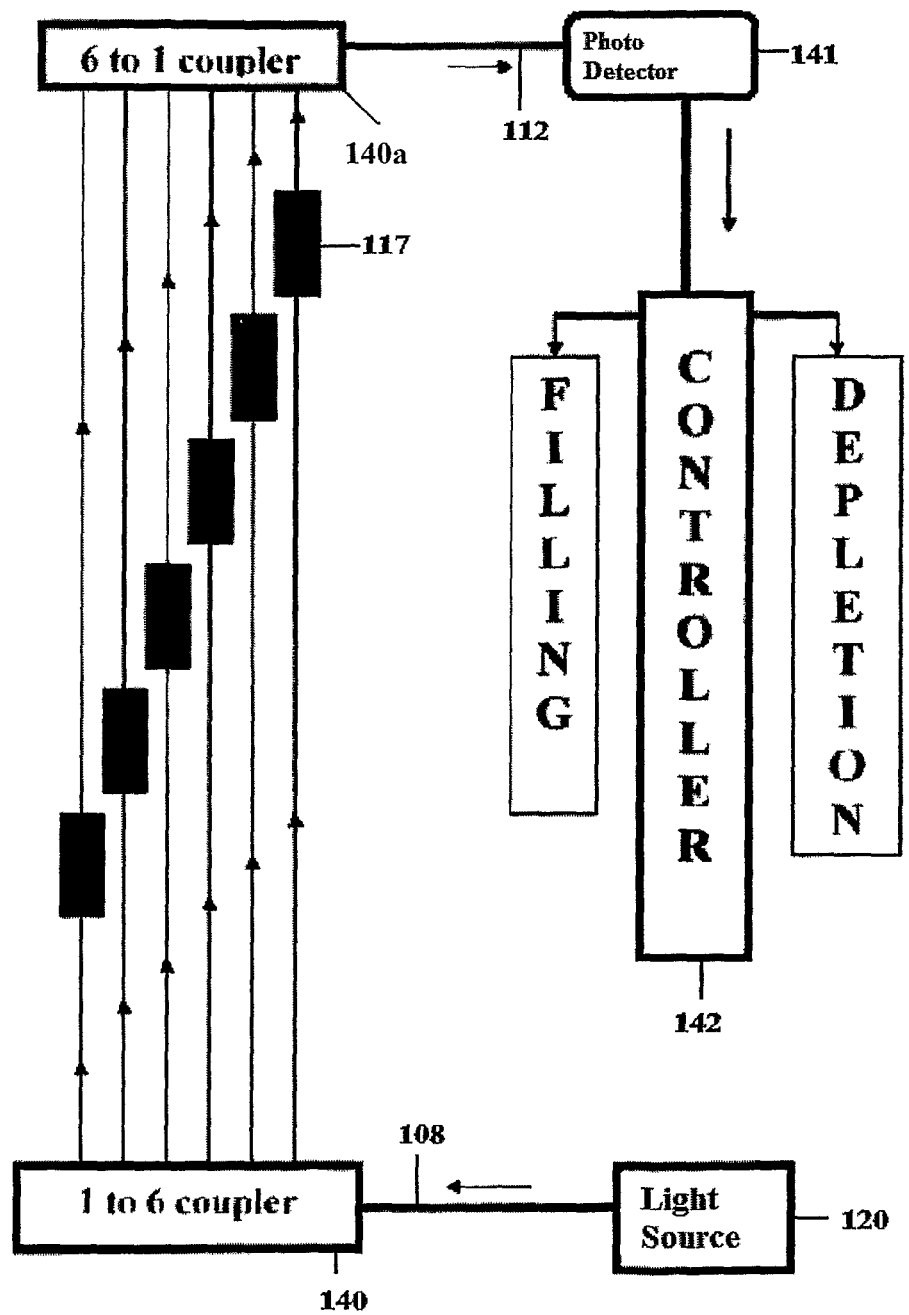
FIG. 14 is a block diagram of an array of six fiber optic liquid level detectors of the present invention connected to a Controller.

The method of detecting the liquid level by using the fiber optic liquid level detector of the present invention is now described by referring to FIGS. 13 and 14.

The method is now described while the tank 118 is filled with a selected liquid and the depletion of the same.

FIG. 13 is a block diagram of the fiber optic liquid level detector of the present invention connected to photo detector 141 and Controller 142.

In order to detect the liquid level in the tank 118 during the course of filling of the same with the desired liquid, the fiber optic liquid level detector is arranged in the tank 118 at a desired position up to which the liquid is to be filled. The liquid is permitted to enter the tank 118. A light source 120 is activated and the corresponding optical beam 109 is permitted to pass through the liquid level detector 117 and the un-deviated optical beam 110 is collected by the fiber optic receiver 112 as long as the liquid does not reach the critical point of exit surface 105a (105b???). The photo detector 141 senses the optical beam from the fiber optic receiver 112 and transmits an electrical signal in the form of voltage or current to the signal conditioning module in the Controller 142. Any semi-conducting diode-based photo detector with a response time of 1 msec or less can be used. The controller is a standard commercial Proportional, Integral and Differential (PID) controller with signal conditioners and input/output devices. The PID controller reads the status of the input signals from the photo detector 141 through the signal conditioner and based on a pre-set logic activates final control devices like pumps, valves etc through the output devices, to regulate the sequence of filling/draining. The moment liquid reaches the critical point of exit surface 105a (105b???), the optical beam undergoes deviation and the corresponding signal—absence of light detection at photo detector 141 is communicated to the Controller 142, thereby indicating the presence of liquid at the desired level. This signal is connected to voltage comparator/threshold detector to ascertain the liquid level in the tank. The analog value of the voltage or current is then evaluated by the Controller 142 to indicate the level of the liquid 113. This operation can also be performed for multiple level liquid filling by using an array of fiber optic liquid level detectors 117 along with couplers 140 as shown in FIGS. 12 and 14. The couplers as used in the present invention are of the type wherein the light is guided from one fiber and split into 'N' beams of equal intensity and each of them is guided into 'N' separate fibers. The total number of beams 'N' is same as the number of fiber optic detectors used in the array. In this invention as an exemplary embodiment a coupler that splits a single beam to generate six beams is used for handling the six fiber optic level detectors independently and it is within the purview of the invention to use as many couplers as required for splitting the single beam.

In a similar way the depletion of the liquid level in the tank 118 is also determined whenever the liquid level recedes below the critical point of exit surface 105a (105b???) of fiber optic liquid level detector 117 of the present invention.

Advantages of the Present Invention

1. With the hollow prism of the present invention, the level detection process depends only on the refractive index of the liquid and not on other conditions of the liquid such as temperature and pressure, which change dynamically in cryogenic liquid environments.
2. The hollow prism of the present invention is simple in construction, robust in operation, does not call for special skills to understand and operate, easy to manufacture in large scale, industrially viable and does not require optical surfaces of high accuracy.
3. Re-calibration of the fiber optic liquid level detector of the present invention is eliminated whenever a liquid under test is changed.
4. The hollow prism of the present invention can be miniaturized by reducing the optical volume of the hollow prism.
5. The hollow prism of the present invention can also be permitted to have three degrees of freedom of linear movement in the x-y plane and one degree of freedom of rotation about z-axis, and used as a float and arrested at the desired location for liquid level detection.
6. The hollow prism of the present invention can operate at pressures as high as 10 bar and at temperatures as low as that of liquid Helium.
7. The orientation of the hollow prism of the liquid level detector of the present invention can be changed by 180°.
8. The fiber optic liquid level detector of the present invention exhibits identical response time for liquid level detection during filling as well as draining operations and the response is very fast since detection occurs at the speed of light.

Without departing from the spirit and scope of this invention, one of ordinary skill can make various changes and modifications to the invention to adapt it to various usages and conditions. As such these changes and modifications are properly, equitably, and intended to be, within the full range of equivalence of the following claims.

We claim:

1. A hollow prism for detecting liquid level in the presence of an optical beam, comprising; a hollow member with a suitable geometry, a first planar surface disposed at proximal end of said hollow member, wherein said first planar surface disposed normal to geometrical axis of said hollow member, a second planar surface disposed at distal end of said hollow member and at an inclined angle 'α' to said first planar surface, a first dielectric member sealed to said first planar surface, a second dielectric member sealed to said second planar surface, a sealed hollow space disposed between said first and second dielectric members and, wherein an incident optical beam enters through said first dielectric member and exits as an emergent optical beam through said second dielectric member, and wherein said emergent beam remains undeviated when said hollow member not immersed in a liquid medium and said emergent beam suffers deviation when immersed in said liquid medium.

2. The hollow prism as claimed in claim 1, wherein said hollow member is opaque or transparent, metallic or non-metallic.

3. The hollow prism as claimed in claim 1, wherein said geometry is cylindrical or polygonal.

4. The hollow prism as claimed in claim 1, wherein said inclined angle 'α' is in the range of 10-70°.

5. The hollow prism as claimed in claim 1, wherein said first and second dielectric members are transparent or semi-transparent.

6. The hollow prism as claimed in claim 1, wherein said first and second dielectric members are transparent parallel plates or films made of Diamond, Sapphire, Quartz, Silicon, Germanium, an amorphous fused quartz, boro silicate crown, Poly methyl methacrylate (PMMA), Poly Vinyl Chloride (PVC) or a combination thereof.

7. The hollow prism as claimed in claim 1, wherein surfaces of said first and second dielectric members are without high optical accuracy.

8. The hollow prism as claimed in claim 1, wherein the size of said sealed hollow space is variable.

9. The hollow prism as claimed in claim 1, wherein a collimating lens disposed coaxially in said hollow member, in lieu of said first dielectric member.

10. The hollow prism as claimed in claim 1, wherein a fiber optic transmitter (108) disposed coaxially in said hollow member, in lieu of said first dielectric member.

11. The hollow prism as claimed in claim 1, wherein a collimating lens and a fiber optic transmitter disposed coaxially in said hollow member, in lieu of said first dielectric member.

12. A fiber optic liquid level detector, comprising: a supporting member, a holding member connected to said supporting member, a hollow prism including a hollow member with a suitable geometry, a first planar surface disposed at proximal end of said hollow member, wherein said first planar surface disposed normal to geometrical axis of said hollow member, a second planar surface disposed at distal end of said hollow member and at an inclined angle 'α' to said first planar surface, a collimating lens disposed coaxially in said hollow member, a fiber optic transmitter sealed coaxially in said hollow member at said proximal end, a dielectric member disposed on said second planar surface and sealed, a sealed hollow space disposed between said fiber optic transmitter and said dielectric member, and wherein an incident optical beam from said fiber optic transmitter exits as an emergent beam through said dielectric member, wherein said emergent beam remains undeviated 110 when said hollow member not immersed in a liquid medium and said emergent beam suffers deviation when immersed in said liquid medium, a distance regulator mounted on said supporting member, a fiber optic receiver connected to said distal end of said distance regulator and coaxially arranged with said fiber optic transmitter to receive an undeviated optical beam, a housing with openings for entry of liquid, a detector connected to said fiber optic receiver, and a controller connected to said detector.

13. The fiber optic liquid level detector as claimed in claim 12, wherein said hollow member is opaque, transparent, metallic or non-metallic.

14. The fiber optic liquid level detector as claimed in claim 12, wherein the configuration of said hollow member is cylindrical or polygonal.

15. The fiber optic liquid level detector as claimed in claim 12, wherein said inclined angle 'α' is in the range of 10-70°.

16. The fiber optic liquid level detector as claimed in claim 12, wherein said dielectric member is transparent or semi-transparent.

17. The fiber optic liquid level detector as claimed in claim 12, wherein said dielectric member is a parallel plate or a film made of Diamond, Sapphire, Quartz, Silicon, Germanium, an amorphous fused quartz, boro silicate crown, Poly methyl methacrylate (PMMA), Poly Vinyl Chloride (PVC) or a combination thereof.

18. The fiber optic liquid level detector as claimed in claim 12, wherein surface of said dielectric member is not with high optical accuracy.

19. The fiber optic liquid level detector as claimed in claim 12, wherein the size of said sealed hollow space is variable.

20. The fiber optic liquid level detector as claimed in claim 12, wherein the collimating lens disposed coaxially in said hollow member, in lieu of said first dielectric member.

21. The fiber optic liquid level detector as claimed in claim 12, wherein a plurality of said fiber optic level detectors are connected in series.

22. The fiber optic liquid level detector as claimed in claim 12, wherein said hollow member disposed in said liquid medium as a float.

23. The hollow prism as claimed in claim 1, wherein said inclined angle 'α' is in the range of 30-45°.

24. The fiber optic liquid level detector as claimed in claim 12, wherein said inclined angle 'α' is in the range of 30-45°.

* * * * *